(12) United States Patent
Hamada et al.

(10) Patent No.: US 7,030,889 B2
(45) Date of Patent: Apr. 18, 2006

(54) DATA DISPLAY SYSTEM, DATA DISPLAY METHOD, COMPUTER AND COMPUTER PROGRAM PRODUCT

(75) Inventors: Seiji Hamada, Sagamihara (JP); Isao Kadowaki, Zama (JP)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 09/993,866

(22) Filed: Nov. 5, 2001

(65) Prior Publication Data
US 2002/0057272 A1    May 16, 2002

(30) Foreign Application Priority Data
Nov. 14, 2000  (JP) .............................. 2000-347286

(51) Int. Cl.
G09G 5/00        (2006.01)
(52) U.S. Cl. .................................................... 345/619
(58) Field of Classification Search ............... 345/581, 345/619; 707/3, 197; 715/810, 828–830, 715/815
See application file for complete search history.

(56) References Cited

U.S. PATENT DOCUMENTS

| | | | | |
|---|---|---|---|---|
| 5,926,807 A | * | 7/1999 | Peltonen et al. ................ | 707/3 |
| 6,084,585 A | * | 7/2000 | Kraft et al. .................. | 715/733 |
| 6,101,493 A | * | 8/2000 | Marshall et al. ............... | 707/3 |
| 6,330,577 B1 | * | 12/2001 | Kim ........................... | 715/542 |
| 6,753,892 B1 | * | 6/2004 | Chung ......................... | 715/810 |

FOREIGN PATENT DOCUMENTS

| | | |
|---|---|---|
| JP | 02-002455 | 1/1990 |
| JP | 08-016356 | 1/1996 |
| JP | 09-044328 | 2/1997 |
| JP | 11-191106 | 7/1999 |
| JP | 11-219247 | 8/1999 |

OTHER PUBLICATIONS

Copy of Japanese Office Action (with concise English explanation of Japanese Patent Office reasons for refusal of original claims).
Yamaguchi, Suguru, et al., "NeXT Users Guide Book", ASCII Corporation, 1992, pp. 18-19 (Copy of Japanese article and English Translation).

* cited by examiner

*Primary Examiner*—Amr A. Awad
*Assistant Examiner*—Motilewa Good-Johnson
(74) *Attorney, Agent, or Firm*—Farrokh Pourmirzaie (57) ABSTRACT

According to the data display method of the present invention, one or more parts of the data to be displayed in a display area are displayed in full, while the other parts of the data are displayed in predetermined abridged forms representing the parts of data that are not displayed (i.e. abridged data). When the predetermined abridged form representing the abridged data is selected, one or more parts of the data contents are fully displayed and the other parts are abridged. Further, when the data displayed in full is selected, an input operation for the data is initiated. In addition, the contents of the abridged data that are not displayed are not read from a database, and the first data row and the number of data rows in the abridged data group, are stored.

14 Claims, 10 Drawing Sheets

DATA DISPLAY SYSTEM, DATA DISPLAY METHOD, COMPUTER AND COMPUTER PROGRAM PRODUCT

CLAIM OF PRIORITY

This application claims the foreign priority benefits under 35 U.S.C. § 119 of Japanese application No. 2000-347286 filed on Nov. 14, 2000, which is incorporated herein by reference.

BACKGROUND OF THE INVENTION

1. Field of the Invention

The present invention relates to a data list display mechanism and a data list display method using a GUI (Graphical User Interface), and in particular to a technique effectively applied for the display of a large amount of data sets in a limited display area.

2. Background Art

Recently, GUIs are employed as common user interfaces for computer systems, and list boxes are commonly employed as operating means for displaying data lists and for entering data using a GUI.

A list box is a form of window display means that is used for data entry. Ordinarily, in a list box one set of data is associated with an individual row in a square display space, and a list consisting of multiple sets of data occupying multiple rows is displayed. In a GUI environment, a pointer such as an arrow is displayed on a screen and responds to the movement of a mouse. By moving the pointer to a location on the screen where a target data image is displayed and clicking at the image location with the mouse, a user can enter that data. Target data is a data that is to be displayed and be manipulated by the user. Target data consists of one or more rows of data. A list box provides the advantage of a standardized display method, and many database software applications include input operation means that employ list boxes.

When a data list is displayed in this manner, a user can enter data while visually confirming the contents, and can easily enter complicated data or long character strings. That is, since a list of data that is displayed provides input candidates, the user is not required to remember the exact data contents, but rather, can enter data correctly so long as he or she remembers data enough to select the item from the list of available choices. Further, since in this case the data entry will contain no typographical errors, input errors can be prevented.

Operators of a computer system use a standard operator interface to transmit electrical signals to and from the computer system that may represent commands for performing various search and retrieval functions, termed queries, against the databases. For example, these queries may employ Structured Query Language (SQL) and invoke functions performed by Relational Database Management System (RDBMS) software. In a relational database management system, data is stored in a table form comprising rows and columns. The SQL interface has evolved into a standard language for RDBMS software and has been adopted as such by both American National Standards Institute (ANSI) and the International Standards Organization (ISO). The SQL interface allows users to formulate relational operations on the tables either interactively, or in batch files, or embedded in host languages such as C and COBOL.

SQL allows the user to retrieve and manipulate the data. In general, the data is retrieved from the database one row at a time. However, when a query could return more than one row, a special data object called SQL cursor may be used. An SQL cursor allows users to retrieve a set of rows. The SQL cursor is a data structure that represents the current state of a query. The set of all rows that the query produces is called the active set of the cursor. It is easy to think of the SQL cursor as a reading pointer which points to one row of the active set. RDBMS provides special operations such as OPEN, FETCH, etc. for SQL cursor set up and manipulation.

In advanced RDBMS software, a tool (e.g. a query builder) is used for the preparation of an SQL statement by connecting to a database and using the GUI. For the tool to prepare the RDBMS query, there is a request for a process that is performed while actually confirming the contents of the database, such as the designation of a query condition, and in order to satisfy the request, a list box is employed.

Figure 10:
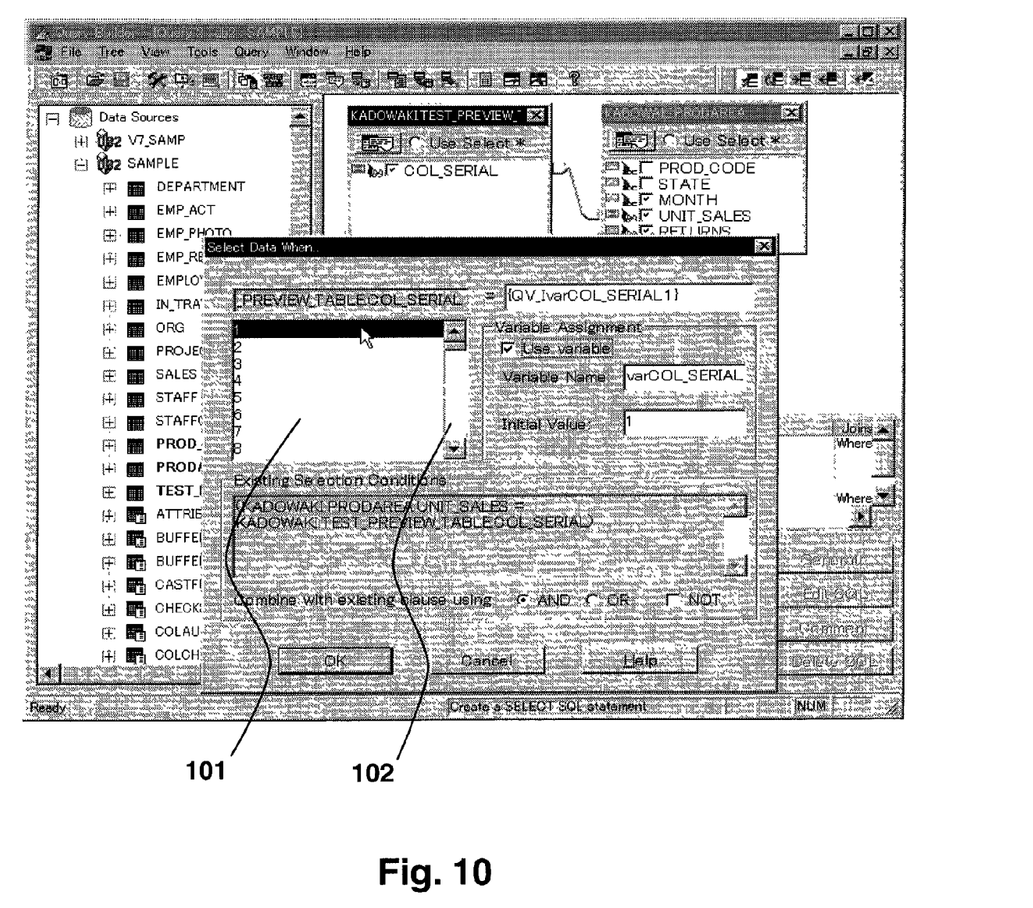
FIG. 10 is a diagram showing a screen for explaining the advantages of the present invention.

For those sets of data in a list that can not be displayed in the limited space of a list box, as is shown in the example in FIG. 10, a scroll bar 102, which is displayed along one side, usually the right side, of the list box 101, can be employed by a user to vertically scroll the displayed data until desired data appears. Or, a constant number of data can be presented in the display space by designating such number by the starting address of data.

However, if a list box is employed to display a very large amount of data, the following problems are encountered when means for using the scroll bar or means for designating and displaying a constant number of data sets is used.

For example, there is a problem that a user can only refer to certain data area, such as the first block of data, or that a user is unable to understand all the data contents at one time. That is, since the display area that is allocated is small relative to the available data, the amount of data that can be presented at one time is limited. Although one advantage of a GUI is that it provides a visual presentation that makes understanding of data easier, such advantage cannot be fully exploited since an all-inclusive view of data cannot be presented due to the display area size.

Further, another problem is that when a list box is used to process a large amount of data, an extended period of time is needed to extract desired data. That is, since only a limited area within a list can be referred to, ascertaining the actual location of that area within the whole body of data is quite difficult. Thus, if there is a lot of desired data within the list box, in order to locate target data, a user must scroll through all data from the beginning, or must designate data locations depending on his/her perception. This is not suitable when there is an enormous amount of data to be processed: target data cannot easily be extracted for display, and an advantage afforded by a GUI, improved user convenience, is degraded. Therefore, a demand exists for means to manage the entire body of data that is accessed in such a case.

In addition, when a GUI is used on a client in a network environment wherein a storage area, such as a database, for storing display data is prepared in a server, the data to be displayed in a list box must be transferred. In this case, means for using the scroll bar must receive target data via the network before it can be displayed, and another problem exists in that an increased load is imposed on the network.

It is, therefore, desirable to display a large amount of data in a list box so that the contents of all data can be recognized. It is also desirable to reduce the data transmission load in order to facilitate the display of data in a list box.

SUMMARY OF THE INVENTION

To overcome the limitations in the prior art, and to overcome other limitations that will become apparent herein, the present invention discloses a data display system, a data display method, and a computer program product embodying a data display method.

An overview of the present invention will now be presented. According to the data display method of the present invention, some blocks of data to be displayed in a list are displayed in full, while all other blocks of data are abridged or abbreviated. The data to be displayed in full is, for example, the first row and the last row of the target data. An intermediate data block may also be included in the data displayed in full. The list of the other data is displayed, on one row, in a predetermined abridged form representing the data block that is not displayed. Since both the actual data block and the predetermined abridged form that represents the abridged data block are displayed, an overall representation of the target data can be provided in a limited display area. That is, a bird's eye view of all the data can be displayed.

Furthermore, in the present invention, when a predetermined abridged form representing the abridged data block is selected, some blocks of the data contents are fully displayed and the other blocks are displayed in an abridged form as described above. Since multiple abridged forms may be displayed, the search time can be reduced and desired data can be reached more quickly.

Further, in this invention, when the data displayed in full is selected, an input operation for the data can be initiated. Thus, even if the target data is complicated, it can be searched for while referring to the contents of the data, and input errors can be prevented. In short, a display/input interface that is extremely convenient for a user is provided.

In addition, in the present invention, the contents of the abridged data are not read from the database, only the fully displayed blocks of data are read from the database. Thus, the communication load for data access can be reduced, and a very convenient GUI can be provided that imposes only a small communication load, especially in a network environment, such as the Internet.

In this specification, the term "target data" refers to the data, which is to be displayed and be subject to user manipulation. The term "data sets" refers to one or more data blocks, which are actually displayed. The term "data groups" refers to one or more data blocks other than the data sets, which are not displayed but are represented in predetermined abridged forms using one or more predetermined displays. Each data block consists of one or more rows of target data. The term "predetermined displays" is used to identify one or more predetermined abridged forms of data (i.e. the data groups). A predetermined display includes an image display, a text display, a color display, a pattern or shaded display, or any other type of display that will help a user to identify an abridged data in the display area. The term "reading pointer" refers to a pointer that points to the current row of the target data. For example, the reading pointer could be an SQL cursor.

Explanations for the present invention are enumerated as follows. According to the preferred embodiment of the present invention, a computer system comprises: a display device having a display area on a display screen thereof, wherein, out of target data to be displayed in the display area, one or multiple first data sets, the contents of which are actually displayed, and one or multiple first predetermined displays, which represent one or multiple first data groups of target data other than the first data sets, are presented in the display area. At this time, the first data sets and the first data groups can be sorted in the ascending order or in the descending order, and the first data sets and the first predetermined displays can be presented in their sorting orders. The first data sets can include the first and the last data of the target data. Further, by the operation of selecting the first predetermined displays, one or multiple second data sets, the contents of which are actually displayed, and one or multiple second predetermined displays, which represent one or multiple second data groups of target data other than the second data sets, can be presented together with the first data sets in the display area. The first predetermined displays and the second predetermined displays can be correlated with the first data rows and the number of data rows of the first data groups and the second data groups, respectively. Further, the selection of the first or the second data sets can be a data entry operation. The target data may be recorded in a different computer system connected to the computer system via communication means, and the contents of the first data groups and the second data groups are not transmitted from the different computer system to the computer system.

According to the preferred embodiment of the present invention, a data display method, for displaying target data in a display area on the display screen of a computer system, comprises the steps of: identifying first data sets, which are included in the target data to be displayed in the display area and the contents of which are actually displayed in the display area; identifying first data groups, which are included in the target data other than the first data sets and the contents of which are not displayed in the display area; reading the first data sets from a recording area wherein the target data is stored and displaying the first data sets in the display area; and presenting first predetermined displays representing the first data groups in the display area. The data display method further comprises the steps of: selecting the first predetermined displays; identifying second data sets, which are included in the first data groups and the contents of which are actually displayed in the display area; identifying second data groups, which are included in the first data groups other than the second data sets and the contents of which are not displayed in the display area; reading the second data sets from the recording area where the target data is stored and displaying the second data sets in the display area; and presenting second predetermined displays that represent the second data groups in the display area. The first predetermined displays and the second predetermined displays are correlated with the first data rows and the number of data rows of the first data groups and the second data groups, respectively. While the first predetermined displays or the second predetermined displays that represent the first data groups or the second data groups respectively are presented and a reading pointer for the target data is skipped by the number equivalent to the number of data rows of the first or second data groups, the step of reading and displaying the first or second data sets is repeated for the target data located immediately after the reading pointer. The displaying step can be repeated until all the target data are displayed in the display area.

BRIEF DESCRIPTION OF THE DRAWINGS

The advantages of the present invention will become more apparent to those of ordinary skill in the art after considering the preferred embodiments described herein with reference to the attached drawings in which like reference numbers represent corresponding parts throughout.

DETAILED DESCRIPTION OF THE PREFERRED EMBODIMENT

The preferred embodiment of the invention will now be described in detail while referring to the accompanying drawings. It should be noted, however, that the present invention can be implemented by many various modes, and is not limited to this embodiment. For example, although the preferred embodiment is described using RDBMS, other forms of databases including hierarchical and flat files may be used as data storage mechanism. The same reference numerals are used throughout the embodiment to denote identical components.

In the following embodiment, mainly a method or a system is described. However, it will be obvious to one having ordinary skill in the art that the present invention can be implemented not only as a method or a system, but also as an article of manufacture such as a storage medium on which computer-readable program code is stored, or a computer program product. Therefore, the present invention can be carried out using hardware or software or any combination thereof. The storage medium on which program code is recorded can be an arbitrary computer-readable storage medium, such as a hard disk, a floppy disk, a CD-ROM, an optical storage device, or a magnetic storage device.

Figure 1:
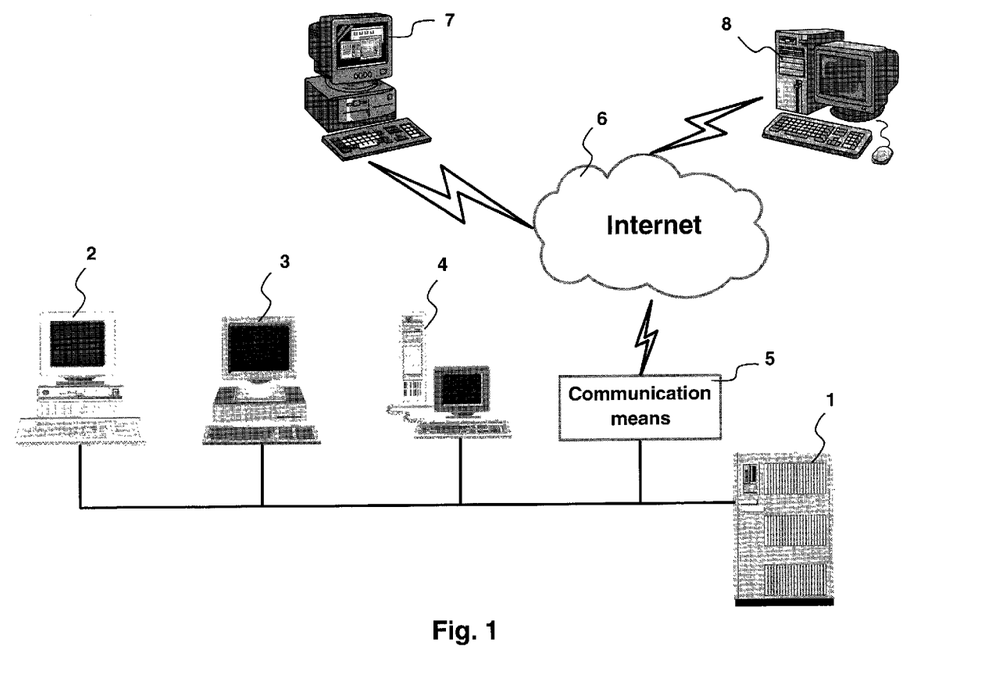
FIG. 1 is a conceptual diagram showing a computer system according to one embodiment of the present invention.

FIG. 1 is a conceptual diagram showing a computer system according to one embodiment of the present invention. The computer system of this embodiment includes a database server 1, computer systems 2, 3 and 4, interconnected to the database server 1 via, for example, a LAN (Local Area Network), communication means 5 used for connection to the Internet 6, and computer systems 7 and 8, which can be connected to the Internet 6.

The target data to be displayed by a data display method or by a data display system in accordance with the preferred embodiment, which will be described later, is stored in the database server 1. The data display system, which will be described later, is installed in the computer systems 2, 3, 4, 7 and/or 8, and employs the data display method that will be described later, to display data stored in the database server 1. The computer systems 2, 3 and 4 can access the database server 1 via the LAN, and the computer systems 7 and 8 can access the database server 1 via the Internet 6 and the communication means 5.

Those of ordinary skill in the art will recognize that commonly used computer systems may be employed as the database server 1 and as the computer systems 2 to 4, 7 and 8 within the preferred embodiment. A computer system according to the preferred embodiment of the present invention comprises a central processing unit (CPU), a main memory (RAM (Random Access Memory)) and a nonvolatile storage device (ROM (Read Only Memory)), all of which are interconnected by a bus. A co-processor, an image accelerator, a cache memory and an input/output controller (I/O) are also connected to the bus. An external storage device, a data input device, a display device and a communication controller may also be connected to the bus via an appropriate interface. Further, a hardware resource, which is generally included in a computer system, can also be provided. A hard disk can be used as an exemplary external storage device, but the external storage device is not limited to this and includes a magneto-optical storage device, an optical storage device or a semiconductor storage device, such as a flash memory. A read only storage device, such as a CD-ROM, used only for the reading of data, can also be included as an external storage device if it is used only for reading data or a program. A data input device can be an input device such as a keyboard, or a pointing device such as a mouse, and may also be a speech input device. An exemplary display device can be a CRT, a liquid crystal display device or a plasma display device. Those of ordinary skill in the art will recognize that the computer system in this embodiment includes various types of computers, such as a personal computer, a workstation and a mainframe computer.

As is shown in FIG. 1, in this embodiment a configuration is employed whereby various computer systems 2, 3, 4, 7 and 8 access the separately provided database server 1 via the LAN (i.e. the communication means 5) or the Internet 6. The computer system of this embodiment can also be employed as a stand-alone computer system, and a WAN (Wide Area Network) can be used instead of the Internet 6 or the LAN. A communication network used for the connection may be either a private network or a public network.

When the present invention is implemented using multiple computer systems, the program used by each computer system may be stored in another computer system, for example, in a server computer. That is, one part of the program used by a computer system can be distributed and processed by a remote computer (i.e. the server computer) or by a client computer. The program stored in a different computer system may be referenced by its address information using a DNS, a URL or an IP address. The data described in this embodiment may also be distributed and recorded by a remote computer. The distributed data may be accessed through its location designated using the DNS, the URL or the IP address.

Those of ordinary skill in the art will recognize that the term "Internet" also includes intranets and extranets and "accessing the Internet" also refers to accessing intranets or extranets, and that the term "computer network" includes computer networks that permit both public and private access.

Figure 2:
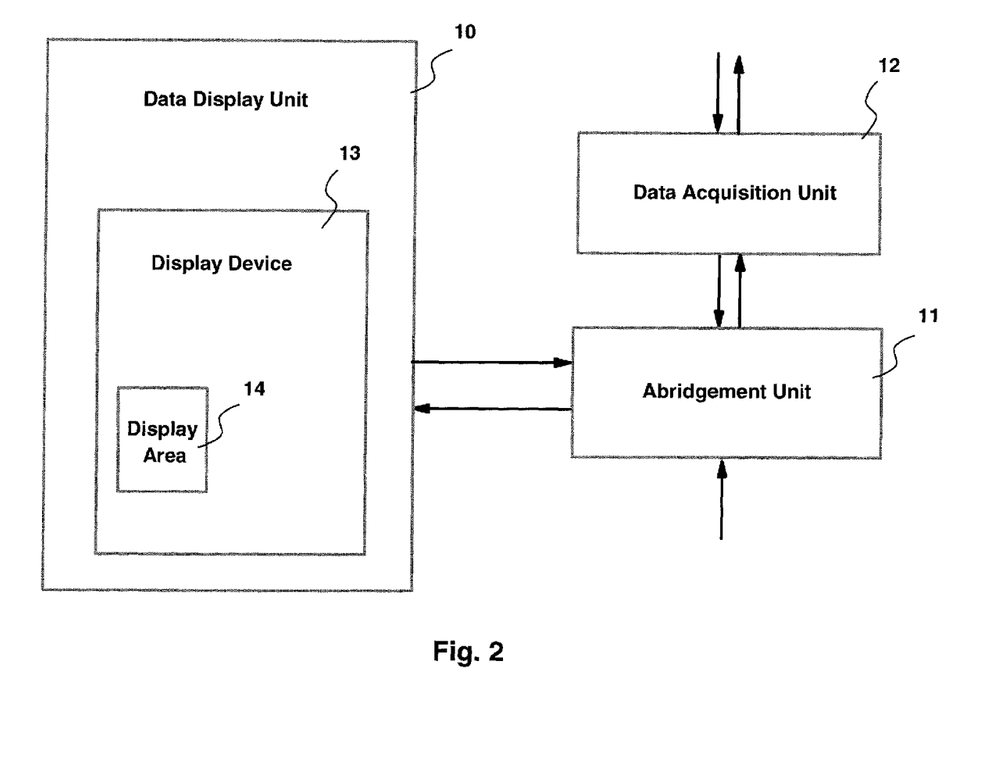
FIG. 2 is a functional block diagram showing an exemplary data display system according to the embodiment of the present invention.

FIG. 2 is a functional block diagram showing an exemplary data display system for the preferred embodiment of the present invention. The data display system in FIG. 2 is installed in the computer systems 2, 3, 4, 7 and 8, as described above. The data display system need not always be installed in computer systems, however, it may instead be installed, for example, in an application server and be used to display data on the display screen of each connected computer system.

The data display system in FIG. 2 includes a data display unit 10, an abridgement unit 11 and a data acquisition unit 12. The data display unit 10 includes a display device 13, which includes a display area 14.

A GUI is employed for the data display unit 10, and data extracted by the abridgement unit 11 and graphical images for abridged or abbreviated data entries that represent non-displayed data blocks, are displayed in the display area 14 of the display device 13. The data display unit 10 issues a request to the abridgement unit 11 when the graphical image for an abridged data entry is selected, and at this time, the abridgement unit 11 again abridges or abbreviates a non-displayed data block and forwards the results to the data display unit 10.

Upon the receipt of a data preview request, the abridgement unit 11 accesses the database via the data acquisition unit 12 and obtains the total number of data rows and other necessary data. The number obtained for data rows is used as a determination reference, and when the number of data rows exceeds the number of data rows that can be extracted and displayed during one operation, the abridgement process is performed. During the abridgement process, the data rows are arranged in the ascending order and are extracted at the same interval, and information for a non-displayed data block is generated.

Figure 3:
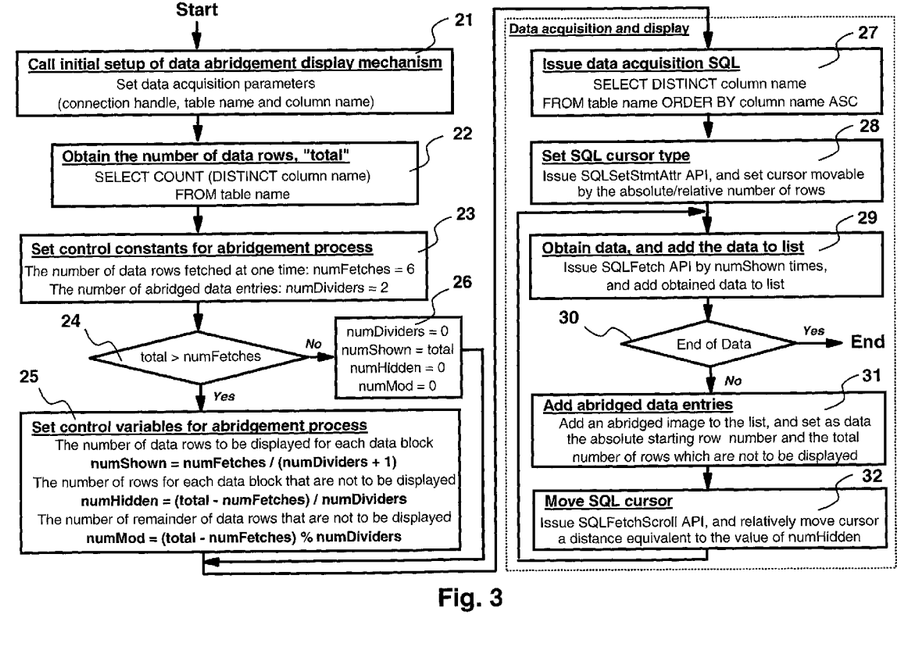
FIG. 3 is a flowchart for the process performed when new data is displayed in a display area.

FIG. 3 is a flowchart for the process performed to display new data in the display area 14. First, upon the receipt of a request for displaying target data in the display area 14, the process is initiated and the initial setup of data abridgement display mechanism is called in step 21. In this step, data acquisition parameters, such as a connection handle, a data table name and a data column name, are obtained and set.

Then, in step 22, the total number of rows of the target data to be displayed is obtained from RDBMS using an SQL statement such as "SELECT COUNT (DISTINCT column name) FROM table name". The returned value is stored in a variable named "total".

Next, control constants for the abridgement process is set in step 23. The control constants are comprised of the number of data rows that can be extracted (i.e. fetched) at one time "numFetches", and the number of abridged data entries "numDividers". For example, if a display space (i.e. a visible portion of the display area 14) allows eight rows, the control constants numFetches=6, and numDividers=2 may be defined.

Following this, a check is performed in step 24 to determine whether the value of "total" is greater than the value of "numFetches". That is, a check is performed to determine whether all the data to be displayed can be displayed in the display space. When the decision at step 24 is yes, control variables for the abridgement process are set in step 25. The control variables in the abridgement process are comprised of the number of data rows to be displayed for each data block "numShown", the number of data rows for each data block that are not to be displayed "numHidden", and the number of remainder of data rows that are not to be displayed "numMod". To obtain these variables the following calculations are made:

numShown=numFetches/(numDividers+1)

numHidden=(total−numFetches)/numDividers numMod=(total−numFetches)% numDividers

When the decision at step 24 is no, the program control advances to step 26. At this step, the control constant numDividers=0 and the control variables numShown=total, numHidden=0 and numMod=0 are set.

After step 25 or 26, the program control advances to the data acquisition and data display steps. First, the SQL statement for data acquisition is issued in step 27. For example, a command is executed by designating a variable, such as "SELECT DISTINCT column name FROM table name ORDER BY column name ASC".

Then, the SQL cursor type is set in step 28. For example, "SQLSetStmtAttr" API is issued and a database cursor movable by the absolute/relative number of rows is set.

Next, the data is obtained and added to a display list in step 29. For example, "SQLFetch" API is issued "numShown" times, and the data is obtained and added to the display list.

A check is performed in step 30 to determine whether the end of data has been reached. When the decision at step 30 is yes, the process is terminated. When the decision at step 30 is no, an abridged data entry is added in step 31. For example, an abridged image is added to the list, and is stored while correlated with the absolute starting row number of non-displayed data, and the total number of rows of non-displayed data. Then, the SQL cursor is moved in step 32. For example, "SQLFetchScroll" API is issued and the SQL cursor is relatively moved a distance equivalent to the numerical value of "numHidden".

The process at steps 29 to 32 is repeated "numDividers+1" times, until end of data is reached. It should be noted that, for the last non-displayed data block, at step 32, the SQL cursor is moved a distance equivalent to the number represented by "numHidden+numMod".

Through the above process, the target data is displayed in an abridged form in the display area 14.

Figure 4:
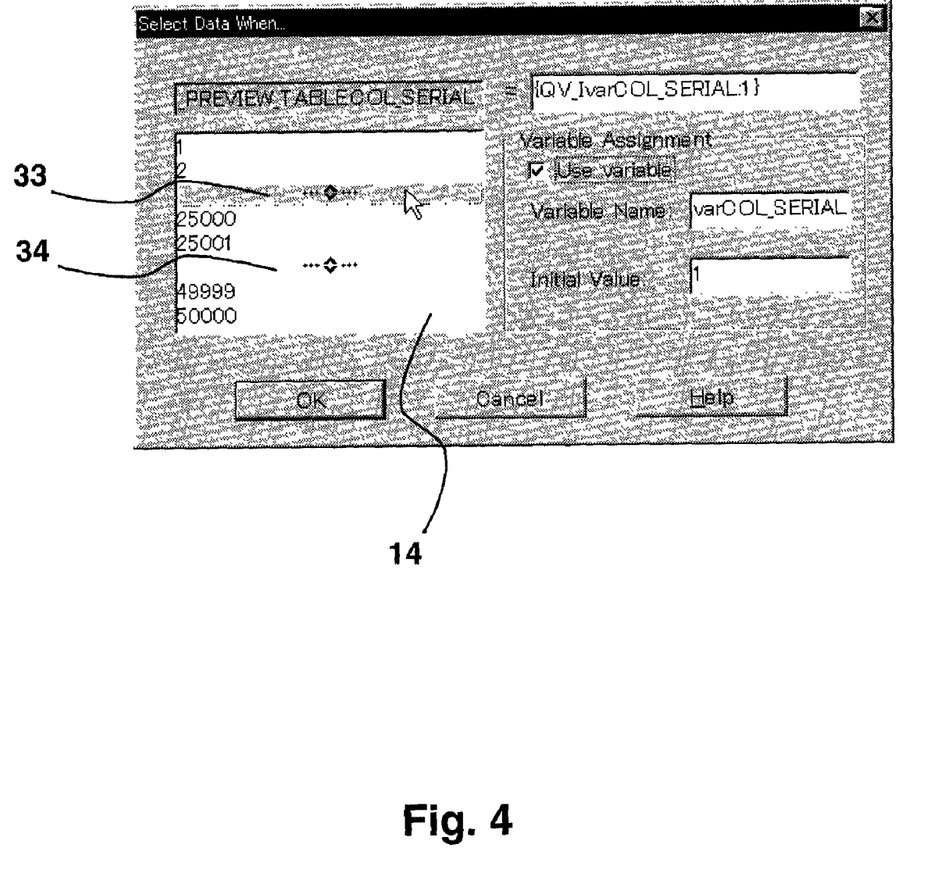
FIG. 4 is a diagram showing a screen wherein new data is displayed in a display area as the result of the process in FIG. 3.

FIG. 4 is a diagram showing a screen on which exemplary data obtained through the above process are displayed. All the data for "1", "2", . . . and "50000" are displayed in the display area 14 in an abridged form. In this example, since there are two abridged entries, two abridgement displays (i.e. abridged images) 33 and 34 are presented and data other than the abridgement displays 33 and 34 are divided into three data blocks while the contents of the data blocks are actually displayed. "1" represents the head of the data, and is displayed in the first block. "50000" is the final data, and is displayed in the third block. "25000" and "25001" are substantially the intermediate points of the data, and are displayed in the second block. The abridgement display 33 represents a data block extending from "2" to "25000" that is not displayed, while the abridgement display 34 represents a data block extending from "25001" to "49999" that is not displayed.

As is described above, in this embodiment, all the data are displayed in a limited display space with the specific data that are displayed in full and in the abridged form. Therefore, the user can obtain a bird's eye view of the data, and can easily understand all of it. Thus, the problem in a conventional program wherein the overall data can hardly be identified because only the head of the data is displayed, can be resolved. Further, as is described while referring to the flowchart in FIG. 3, the contents of data that are not displayed are not read from the database. That is, only the contents of data whose contents are actually displayed are read from the database, and therefore, the communication load imposed by reading out the data can be reduced.

The process for displaying data presented in the abridged form will now be described. To display the contents of data in the abridged form, the abridgement display (i.e. the abridged data entry) 33 or 34 in FIG. 4 is selected by a user operation. For example, a pointer represented by an arrow is moved to the abridgement display 33 or 34, and a button of a mouse is clicked on.

Figure 5:
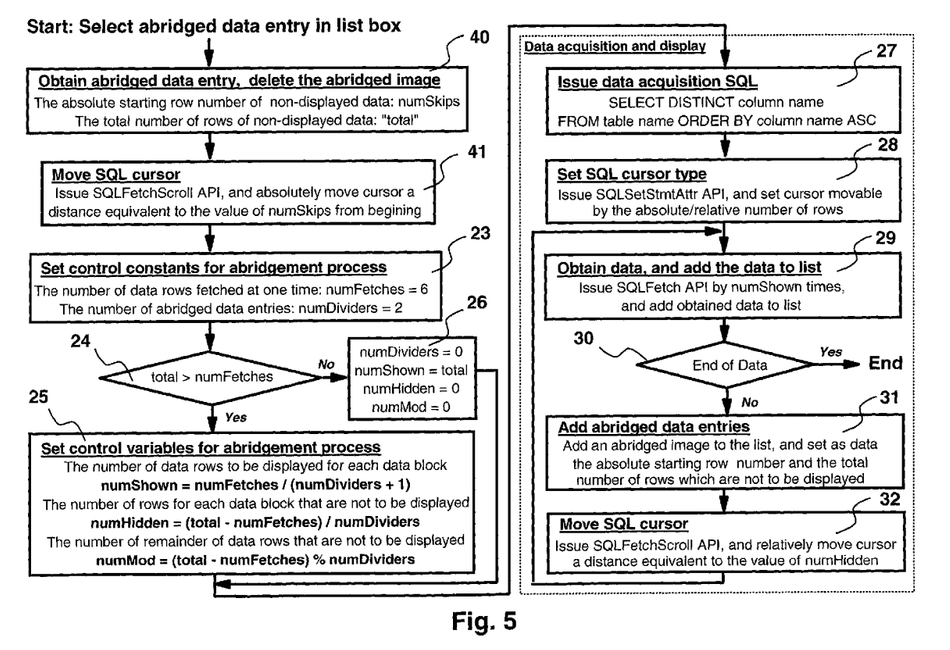
FIG. 5 is flowchart for the process performed when an abridged data entry is selected.

FIG. 5 is a flowchart showing the process performed when an abridged data entry in the list box is selected. This process is initiated by the selection of the abridgement display 33 or 34.

When the process has been initiated, the data associated with the selected abridged data entry is obtained, and the abridgement display (i.e. abridged image) is deleted from the list in step 40. The data associated with the abridged data entries are the absolute starting row number of the non-displayed data "numSkips" and the total number of rows of non-displayed data "total". These values are those recorded at step 31.

Then, the SQL cursor is moved in step 41. That is, "SQLFetchScroll" API is issued, and the cursor is absolutely moved a distance equivalent to the number of "numSkips" from the beginning of target data. Thereafter, the same process is performed as that at steps 23 to 32.

Figure 6:
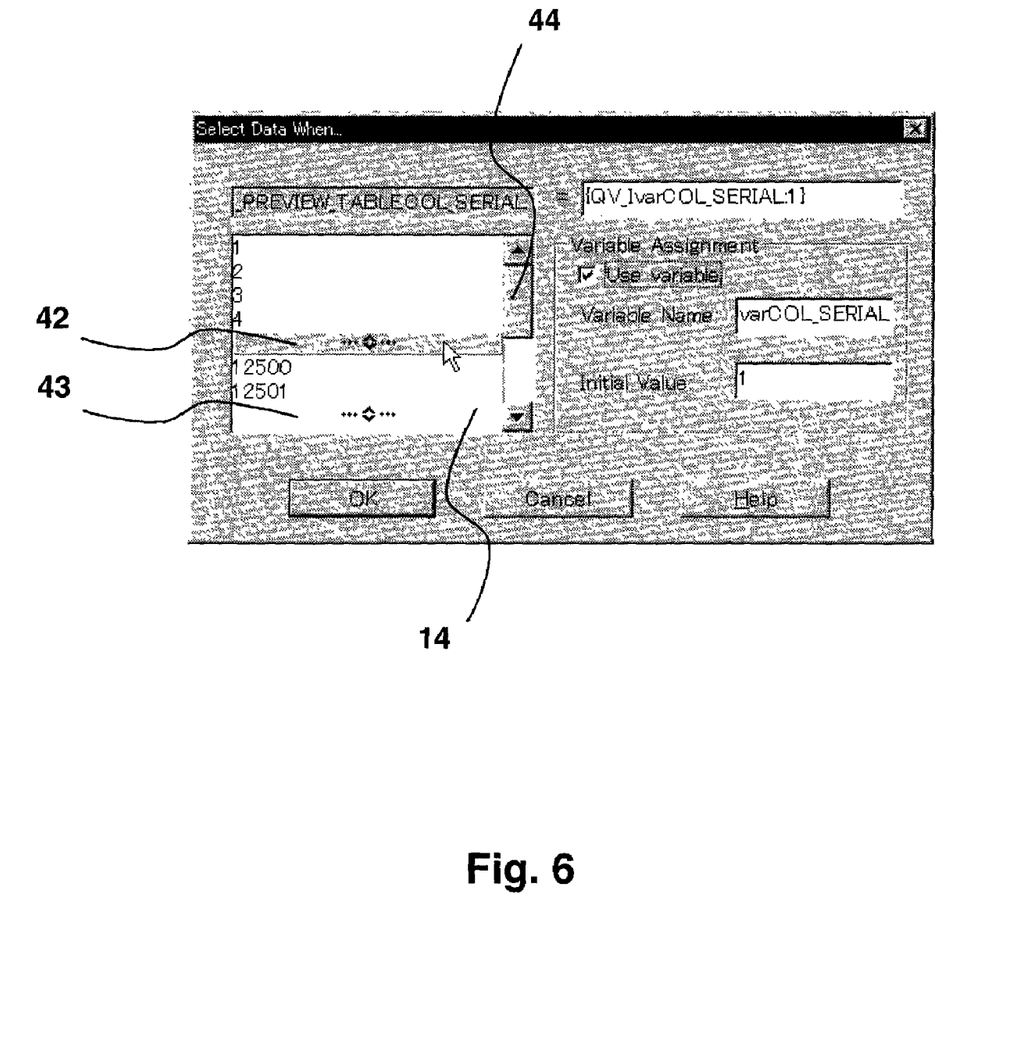
FIG. 6 is a diagram showing an exemplary screen obtained after the process in FIG. 5 has been performed.

Through this process, the abridged data entries are processed as data to be actually displayed and data to be presented in an abridged form. FIG. 6 is a diagram showing a screen obtained after the process in FIG. 5 is performed when the abridgement display 33 is selected. Among the data in the abridgement display 33 in FIG. 4, the first, the intermediate and the last data are actually displayed, and the other data is displayed in the abridged form. As is shown in FIG. 6, the first data "3" and "4" in the abridgement display 33, an abridgement display 42, the intermediate data "12500" and "12501" and an abridgement display 43 are presented. The last data "24998" and "24999" in the abridgement display 33 and the data following the "25000" displayed in FIG. 4 are outside of the display area 14. Therefore, a scroll bar 44 is provided in the display area 14, and these data can be displayed by scrolling.

As is described above, according to the data display method of this embodiment, the abridged data entries can be sequentially displayed by selecting the abridgement displays. Further, in this embodiment, since the abridged data entry is substantially divided into a first half and a second half of data, the desired data can be reached quickly.

The present invention has been described by referring to the preferred embodiment. However, the present invention is not limited to this embodiment, and can be variously modified without departing from the scope of the invention.

Figure 7A:
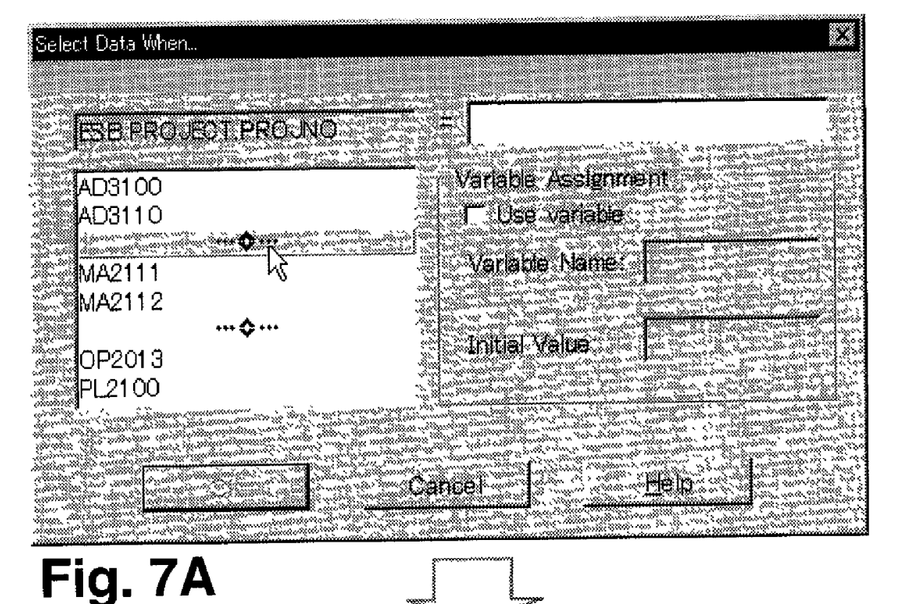
FIGS. 7A and 7B are diagrams showing other exemplary screens for the embodiment.
Figure 7B:
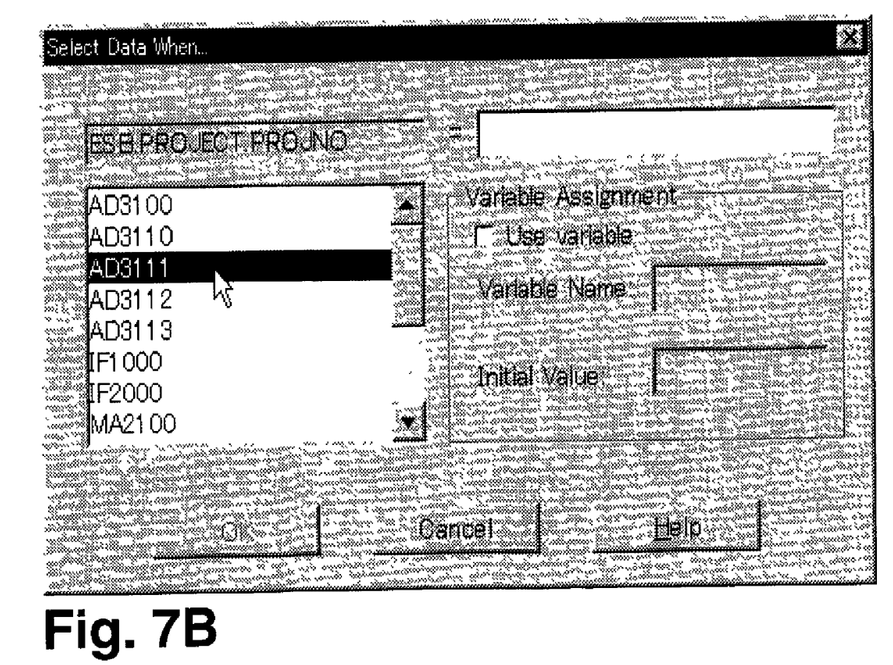
Figure 8A:
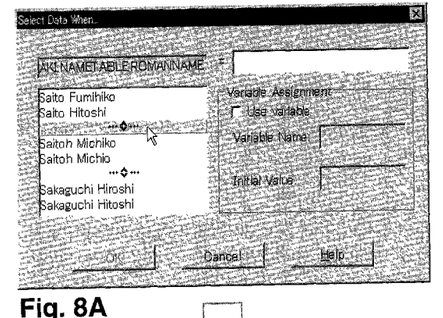
FIGS. 8A–8C are diagrams showing additional exemplary screens for the embodiment.
Figure 8B:
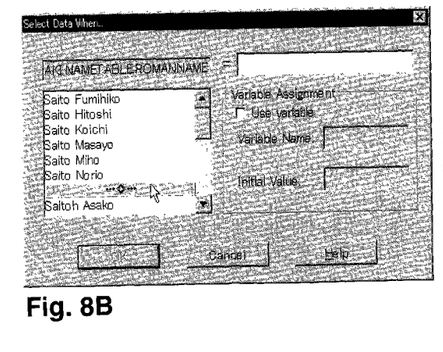
Figure 8C:
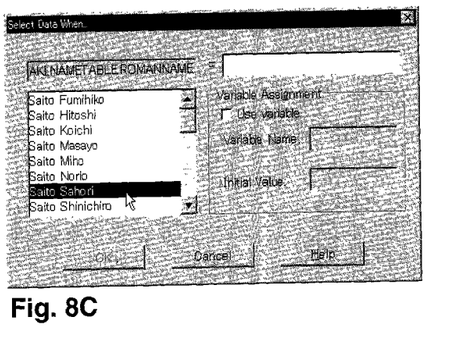

For example, although the preferred embodiment is simply described using numerals as the data contents, the contents of data are not limited to numerical values, and may contain symbols as is shown in FIGS. 7A and 7B, or may be people's names as is shown in FIGS. 8A, 8B, and 8C. It should be noted that the abridgement displays are sequentially selected from FIG. 7A to 7B, or from FIG. 8A to 8B and from FIG. 8B to 8C.

The data display method of the present invention may be used not only for displaying data, but also for inputting data in the application by selecting the actually displayed data, as is shown in FIG. 7B or 8C. This method is effective for a case where data is to be actually displayed and entered, such as the case where the SQL statement is to be prepared. That is, a user need not memorize the exact contents of data, because the user can select contents of the actual data even with a faint memory of the data contents. As a result input errors can be prevented.

Figure 9A:
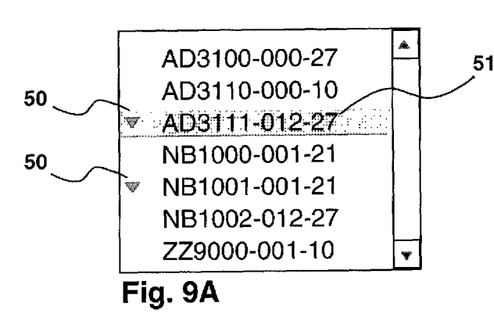
FIGS. 9A–9D are diagrams showing further exemplary screens for the embodiment.
Figure 9B:
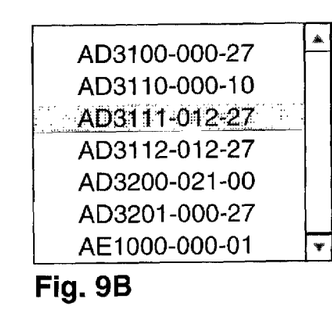
Figure 9C:
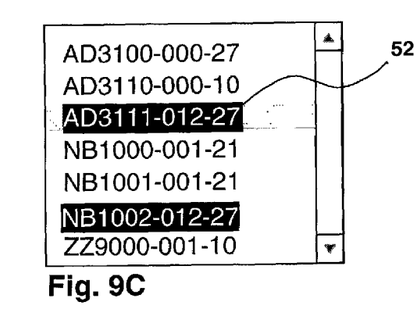
Figure 9D:
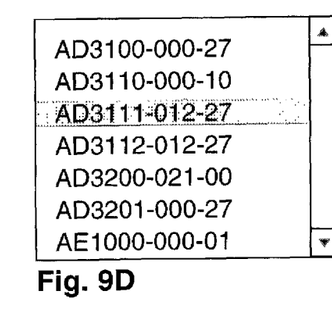

Although in the preferred embodiment the abridgement display is indicated by an icon, a triangular mark 50 may be provided for the data in the abridged form as is shown in FIG. 9A, and the first data 51 in the abridged data entry may be displayed. In this case, the abridged data entry can be selected by either clicking on the row containing the mark 50, or by moving the pointer to the row containing the mark 50 and holding the pointer there for a specific period of time. The abridged data entry is then expanded as shown in FIG. 9B. Or, as is shown in FIG. 9C, the data in the abridged form may be displayed inverted or in colors as in data 52. Again, selecting this inverted data entry will cause the abridged data entry to expand, as is shown in FIG. 9D. Furthermore, not only the first data but also the last data may be presented as the abridgement display as is shown in FIG. 9C. And in addition, arbitrary abridgement information, such as the number of abridged data sets, may be added to the abridgement display (not shown).

In the preferred embodiment, one abridgement display has been selected and is developed into the actual data and the abridgement display at the next level. However, the abridgement display at the next level and the actual data may be returned back to the original abridgement display (a so-called undo process).

Further, although in the preferred embodiment data have been sorted in the ascending order as an example, the data may be sorted in the descending order. Moreover, while in the preferred embodiment the data value (or a code value for character string data) has been employed as a sorting key, the present invention is not limited to this. For example, another field (e.g., the phonetic syllabary for a name) correlated with the displayed data, or one part of the displayed data may be employed. That is, when a format "$$####" (an alphabetical character is allocated for a $ and a numeral is allocated for a #), such as "AD3100", is the displayed data, the upper two digits "$$" or the lower four digits "####" can be used as a sorting key.

In the preferred embodiment, the two division methods for dividing all data using two sets of non-displayed data have been employed. However, the data may be divided by using three or more sets of non-displayed data. In addition, while the division intervals in this embodiment are uniform, they may be non-uniform. Furthermore, another division method (e.g. extraction method) may be employed, by taking into account the deviation of the population relative to a specific parameter employed overall for the data.

In summary, the following effects are specifically obtained by the present invention: A large amount of data can be displayed in a list box, while overall contents of the data can be recognized. That is, a bird's eye view of all the data can be displayed. The search time can be reduced and desired data can be reached more quickly. Further, the data transmission load required for displaying data in the list box can be reduced. In addition, a display/input interface that is extremely convenient for a user is provided.

What is claimed is:

1. A computer system comprising:
   a display device having a display area on a display screen thereof, wherein, out of target data to be displayed in said display area, one or multiple first data sets, the contents of which are actually displayed, and one or multiple first predetermined icons, which represent one or multiple first data groups of the target data other than said first data sets and the contents of which are not displayed, are presented in said display area; and by the operation of selecting at least one of said first predetermined icons, one or multiple second data sets, the contents of which are actually displayed, and one or multiple second predetermined icons, which represent one or multiple second data groups of the target data other than said first and second data sets and the contents of which are not displayed, are presented together with said first data sets in said display area; wherein said first predetermined icons and said second predetermined icons are correlated with the first data rows and the number of data rows of said first data groups and said second data groups, respectively.

2. The computer system according to claim 1, wherein said first data sets and said first data groups are sorted in the ascending order or in the descending order, and said first data sets and said first predetermined icons are presented in sorting orders thereof.

3. The computer system according to claim 1, wherein said first data sets include the first and the last data of said target data.

4. The computer system according to claim 1, wherein the selection of one or more data rows from said first data sets or said second data sets is a data entry operation.

5. The computer system according to claim 1, wherein said target data is recorded in a different computer system connected to said computer system via communication means, and the contents of said first and second data groups are not transmitted from said different computer system to said computer system.

6. A data display method, for displaying target data in a display area on the display screen of a computer system, comprising the steps of:

identifying first data sets, which are included in said target data to be displayed in said display area and the contents of which are actually displayed in said display area;

identifying first data groups, which are included in said target data other than said first data sets and the contents of which are not displayed in said display area;

reading said first data sets from a recording area wherein said target data is stored and displaying said first data sets in said display area;

presenting first predetermined icons representing said first data groups in said display area;

selecting at least one of said first predetermined icons;

identifying second data sets, which are included in said first data groups and the contents of which are actually displayed in said display area;

identifying second data groups, which are included in said first data groups other than said second data sets and the contents of which are not displayed in said display area;

reading said second data sets from said recording area where said target data is stored and displaying said second data sets in said display area; and presenting second predetermined icons that represent said second data groups in said display area.

7. The data display method according to claim 6, wherein said first data sets and said first data groups are sorted in the ascending order or in the descending order, and said first data sets and said first predetermined icons are presented in sorting orders thereof.

8. The data display method according to claim 6, wherein said first and second predetermined icons are correlated with the first data rows and the number of data rows of said first and second data groups, respectively.

9. The data display method according to claim 6, wherein said first or second predetermined icons that represent said first or second data groups respectively, are presented and a reading pointer for said target data is skipped by the number equivalent to the number of data rows of said first or second data groups, while said step of reading and displaying said first or second data sets is repeated for said target data located immediately after said reading pointer.

10. The data display method according to claim 9, wherein said reading and displaying step is repeated until all said target data are displayed in said display area.

11. A data display system, for displaying target data in a display area on the display screen of a computer system, comprising:

means for identifying first data sets, which are included in said target data to be displayed in said display area and the contents of which are actually displayed in said display area;

means for identifying first data groups, which are included in said target data other than said first data sets and the contents of which are not displayed in said display area;

means for reading said first data sets from a recording area wherein said target data is stored, and means for displaying said first data sets in said display area;

means for presenting first predetermined icons representing said first data groups in said display area;

means for selecting at least one of said first predetermined icons;

means for identifying second data sets, which are included in said first data groups and the contents of which are actually displayed in said display area;

means for identifying second data groups, which are included in said first data groups other than said second data sets and the contents of which are not displayed in said display area;

means for reading said second data sets from said recording area where said target data is stored, and means for displaying said second data sets in said display area; and means for presenting second predetermined icons representing said second data groups in said display area.

12. The data display system according to claim 11, further comprising:

means for correlating said first and second predetermined icons with the first data rows and the number of data rows of said first and second data groups, respectively.

13. The data display system according to claim 11, further comprising:

means for presenting said first or second predetermined icons that represent said first or second data groups, means for skipping a reading pointer for said target data by the number equivalent to the number of data rows of said first or second data groups, and means for repeating, for said target data located immediately after said reading pointer, a step of reading and displaying said first or second data sets.

14. An article of manufacture comprising a program storage device readable by a computer and tangibly embodying one or multiple programs of instructions executable by the computer to perform method steps for displaying target data in a display area on the display screen of the computer system, the method comprising the steps of:

identifying first data sets, which are included in said target data to be displayed in said display area and the contents of which are actually displayed in said display area;

identifying first data groups, which are included in said target data other than said first data sets and the contents of which are not displayed in said display area;

reading said first data sets from a recording area wherein said target data is stored and displaying said first data sets in said display area;

presenting first predetermined icons representing said first data groups in said display area;

selecting at least one of said first predetermined icons;

identifying second data sets, which are included in said first data groups and the contents of which are actually displayed in said display area;

identifying second data groups, which are included in said first data groups other than said second data sets and the contents of which are not displayed in said display area;

reading said second data sets from said recording area where said target data is stored and displaying said second data sets in said display area; and presenting second predetermined icons that represent said second data groups in said display area.

* * * * *